United States Patent
Costanza

(10) Patent No.: US 10,246,873 B1
(45) Date of Patent: Apr. 2, 2019

(54) INSULATED STRUCTURAL MEMBERS FOR INSULATED PANELS AND A METHOD OF MAKING SAME

(71) Applicant: KPS Global LLC, Fort Worth, TX (US)

(72) Inventor: James M. Costanza, Flower Mound, TX (US)

(73) Assignee: KPS GLOBAL LLC, Fort Worth, TX (US)

( * ) Notice: Subject to any disclaimer, the term of this patent is extended or adjusted under 35 U.S.C. 154(b) by 0 days.

(21) Appl. No.: 15/814,732

(22) Filed: Nov. 16, 2017

(51) Int. Cl.
*E04B 2/74* (2006.01)
*E04C 2/284* (2006.01)
*E04C 2/38* (2006.01)
*B28B 19/00* (2006.01)
*E04C 2/00* (2006.01)
*B32B 27/40* (2006.01)

(52) U.S. Cl.
CPC .......... *E04B 2/7425* (2013.01); *B28B 19/003* (2013.01); *E04C 2/284* (2013.01); *E04C 2/384* (2013.01); *B32B 27/40* (2013.01); *E04C 2002/005* (2013.01)

(58) Field of Classification Search
CPC ....... B28B 19/003; E04C 2/284; E04C 2/384; E04C 2002/005; B32B 27/40
USPC ........................................................ 52/223.6
See application file for complete search history.

(56) References Cited

U.S. PATENT DOCUMENTS

| | | | | |
|---|---|---|---|---|
| 2,647,287 | A * | 8/1953 | Jones | E04B 1/34321 108/55.1 |
| 3,353,314 | A * | 11/1967 | Melcher | E04B 1/6183 52/127.9 |
| 5,424,118 | A * | 6/1995 | McLaughlin | E04B 1/6183 428/314.8 |
| 6,079,754 | A * | 6/2000 | Alexy | E04B 1/6183 292/101 |
| 6,299,224 | B1 * | 10/2001 | Finkelstein | E04B 1/6183 292/240 |
| 8,776,472 | B1 * | 7/2014 | Kinser, Jr. | E04B 1/80 52/580 |
| 2014/0208673 | A1 * | 7/2014 | Huang | E04B 2/7401 52/234 |
| 2017/0121961 | A1 * | 5/2017 | Hodson | E04B 1/34321 |

* cited by examiner

*Primary Examiner* — Charles A Fox
*Assistant Examiner* — James J Buckle, Jr.
(74) *Attorney, Agent, or Firm* — Marshall, Gerstein & Borun LLP

(57) ABSTRACT

A hybrid structural member for an insulated structural panel includes a core member surrounded on at least two sides by a high-density structural foam. The hybrid structural member may be manufactured by placing a core member in a cavity of an injection mold and surrounding the core member by insulating foam on at least two sides. The core member may be held in place by screws, posts, pins, a vacuum, or other suitable means.

22 Claims, 9 Drawing Sheets

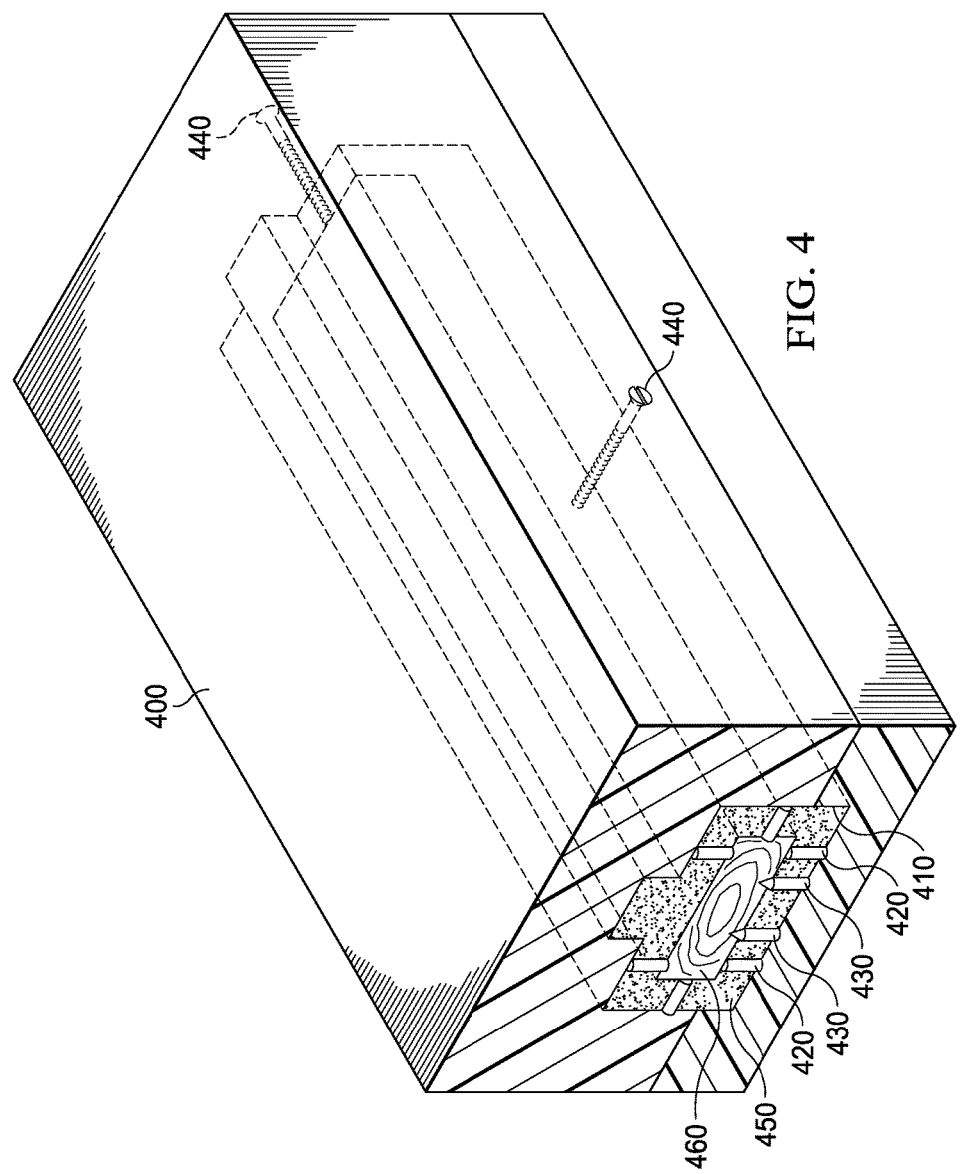

INSULATED STRUCTURAL MEMBERS FOR INSULATED PANELS AND A METHOD OF MAKING SAME

BACKGROUND OF THE INVENTION

1. Field of the Invention

The present invention relates generally to structural insulated panels for use in custom-construction, including custom-designed dwellings, walk-in refrigerator and freezer spaces, and pre-fabricated structures. More specifically, the present invention relates to hybrid structural members for the manufacture such structures.

2. Background of the Invention

Pre-fabricated buildings, and other insulated structures, such as walk-in refrigerator and freezer spaces are typically manufactured and assembled using pre-fabricated insulated structural panels joined together to define the insulated space. The structural panels provide insulation to maintain the temperature inside the structure using as little energy as possible. The most vulnerable areas of the insulated space or located at the joints of the structural panels. Frequently, those joints are made of wood, based on cost and ease of manufacture. However, wood has relatively poor insulative properties compared to the closed-cell insulation between the veneers of the insulated panel, and is subject to moisture absorption, warping, and decay. Additionally, and especially in the case of walk-in refrigerators and freezers, the air inside an insulated area is often at a lower pressure than the ambient air outside of the area, the resultant pressure gradient causes warm air to attempt ingress through the joints between the panels. This vulnerability can lead to some amount of warm (and moist) air moving into the joints between panels. As the warm air cools to at or below the dew point as it moves closer to the enclosed refrigerated area, condensate may form in the joint, which in turn may freeze if the pressure gradient is such that the warm air moves quickly into the joint past the point at which freezing temperatures are found. In the case of walk-in freezer spaces, this condensation can freeze in the joint between structural insulated panels. In cases where the iced portions between the panels thaw and re-freeze, degradation of the wood joints may occur through vapor infiltration, condensate absorption, icing of joint spaces and wood fibers, and joint separation and/or failure. This degradation can result in a dramatic increase in the amount of energy required to maintain the refrigerated walk-in at a suitable temperature for storing perishable goods, a shortened lifespan of the insulated panel, and ultimately increased costs to consumers.

In addition to the problem with existing structural panel systems noted above, over time the structural panels lose insulative properties around the edges of the structural members as a function of the type of structural and insulation materials used. Wooden structural members particularly are susceptible to decay and, as organic materials, are inherently non-uniform in consistency and shape, which can result in variances in insulative properties, warping, and, over time, the development of weakness, shrinkage, expansion, and/or lack of overall structural integrity. Several attempts have been made to address the deficiencies of wooden structural members. The most effective comprises a high-density-polyurethane "rail" ("HDR") that is injection molded to the shape of the necessary structural members for an insulated panel. These HDR systems have much greater insulation properties than wood, and may be manufactured to more precise tolerances. However, pure HDR systems are extremely costly, and are not as structurally sound as wood, metal or rigid polycarbonate plastics. Accordingly, it would be desirable to have a structural member for structural panel-based walk-in refrigerated spaces that has improved insulation, lower cost, improved structural performance, and more precise manufacturing tolerances. Additional benefits include reducing the amount of HDR material needed for higher insulation properties of structural panels, elimination of synthetic backers that are placed between structural members and the panel insulation, and the need for additional metal backplates necessary to support the joint locking mechanisms between panels for purely HDR structural members. Hybrid HDR structural members may be therefore utilize HDR material with densities reduced by 90% or more.

SUMMARY OF THE INVENTION

One embodiment of the invention includes a combination rigid/HDR structural member. In such an embodiment, a rigid structural member, such as dimensional, metal, fiberglass, laminated beam, plywood, carbon, Kevlar, magnesium oxide, or other rigid material, dimensionally smaller than the entire structural member, may be used as a core, or central structure, for a hybrid structural member. The core member may be placed in an injection mold, or other suitable molding form. Once placed in the mold, the mold may be filled with high density rail ("HDR") material, such as an expanding foam like polyurethane, polyisocyanurate, or other expanding insulation, such that at least two sides of the structural member are completely covered by the HDR material. In another embodiment, at least three sides of the core member are surrounded by HDR material. In yet another embodiment, the core member is completely surrounded by HDR material.

In another embodiment, a method for manufacturing a hybrid rigid/HDR structural member is disclosed. In one step, a rigid core member, such as dimensional lumber, plywood, magnesium oxide, gypsum, or other metal or synthetic rigid member or the like, is placed in an injection mold. The core member preferably has at least one dimension smaller than the interior dimension of the injection mold. In another step, the rigid core member is secured in place. In another step, the injection mold is filled with HDR material to form a hybrid structural member with a rigid core member. The core member may be suspended within the injection mold by posts, clips, or fluid, as is known in the art.

Other embodiments in accordance with the spirit and scope of the invention will become apparent to those of skill in the art.

BRIEF DESCRIPTION OF THE DRAWINGS

FIG. 4 shows a portion of an injection mold for manufacturing a hybrid structural member in accordance with an embodiment of the present invention;

DETAILED DESCRIPTION OF THE INVENTION

Figure 1A:
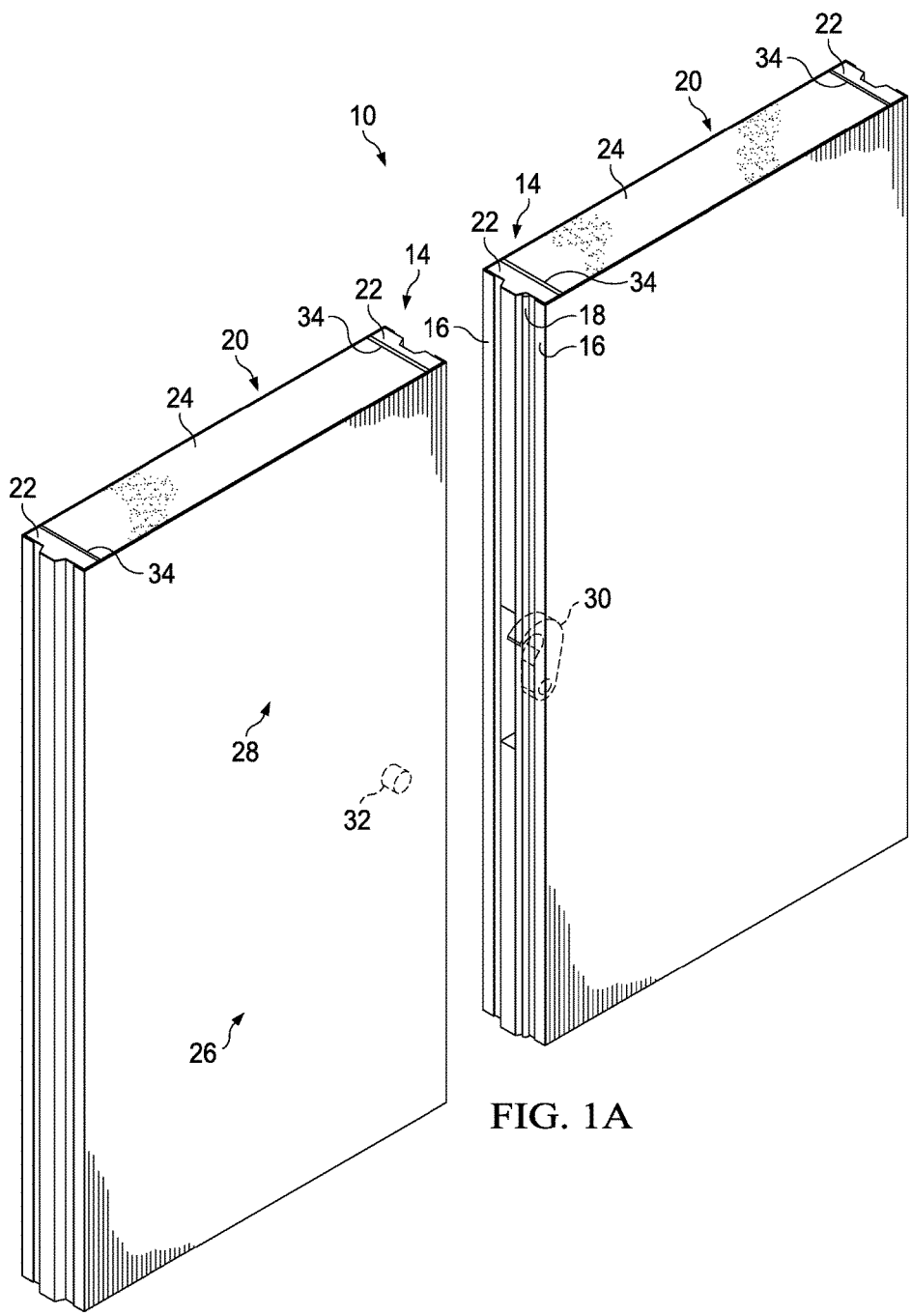
FIG. 1A shows traditional insulated structural panels in accordance with the prior art.
Figure 1B:
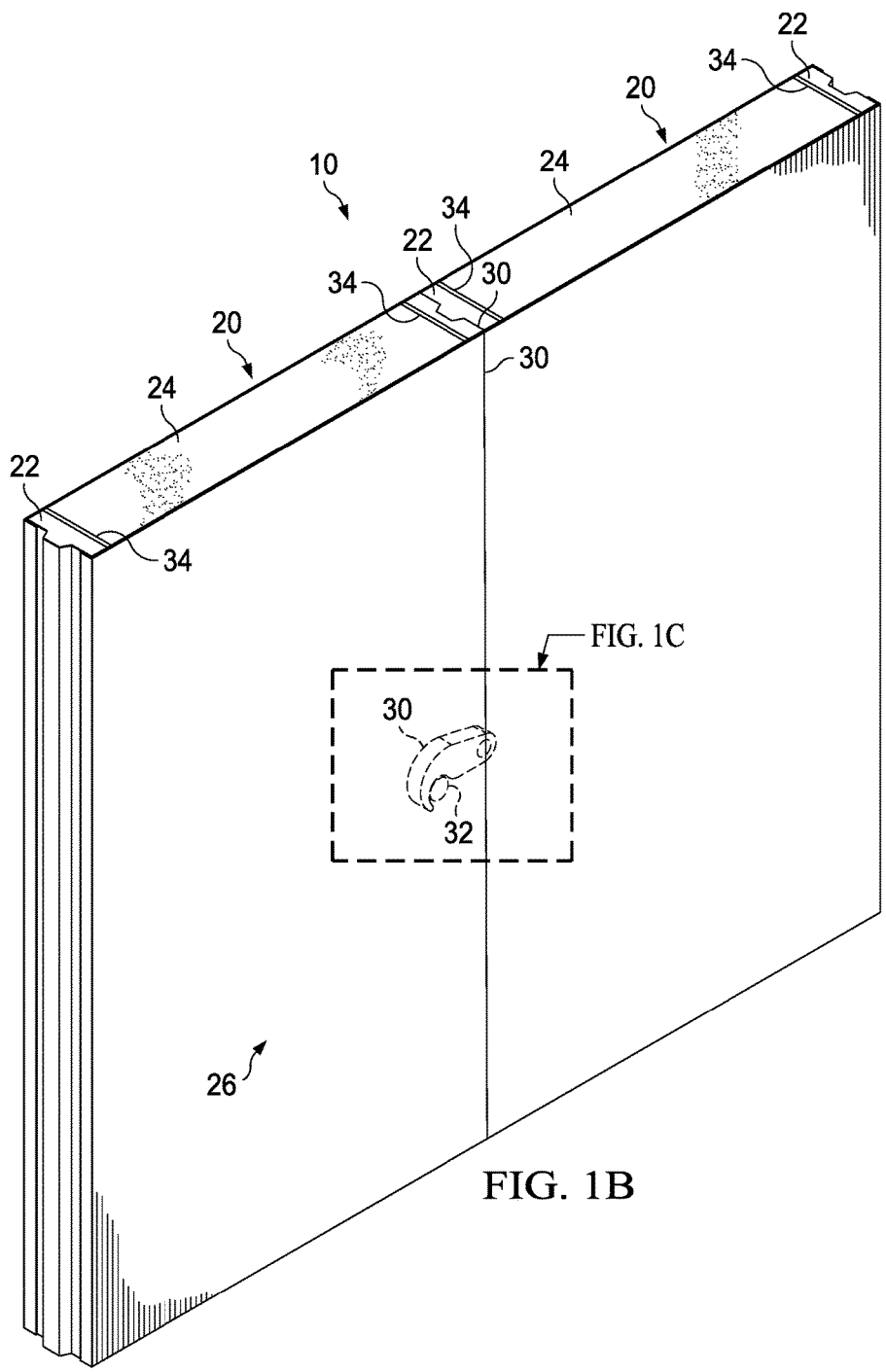
FIG. 1B shows traditional insulated structural panels joined together to form an insulated structural wall.

The present invention is directed to systems and methods of for hybrid structural members for insulated structural panels. FIGS. 1A and 1B generally show a prior art insulated structural panel system that, when joined together, form a wall for a pre-defined or custom-built refrigerated space. In FIG. 1A, for example, two un-joined panels 20 are shown as part of an insulated structural wall 10. Each structural panel 20 is constructed of vertical structural members 22 and horizontal structural members 24. The structural members 22 and 24 may be constructed of wood, a composite, metal, or any other suitable structural material as would be understood by one of ordinary skill in the art. Structural panels 20 are typically constructed using sheathing 26, which may be steel, aluminum, or other suitable sheathing material, which is held into place while an insulating material, such as closed-cell polyurethane foam (not shown) is blown and/or injected between the sheathing 26.

Figure 1C:
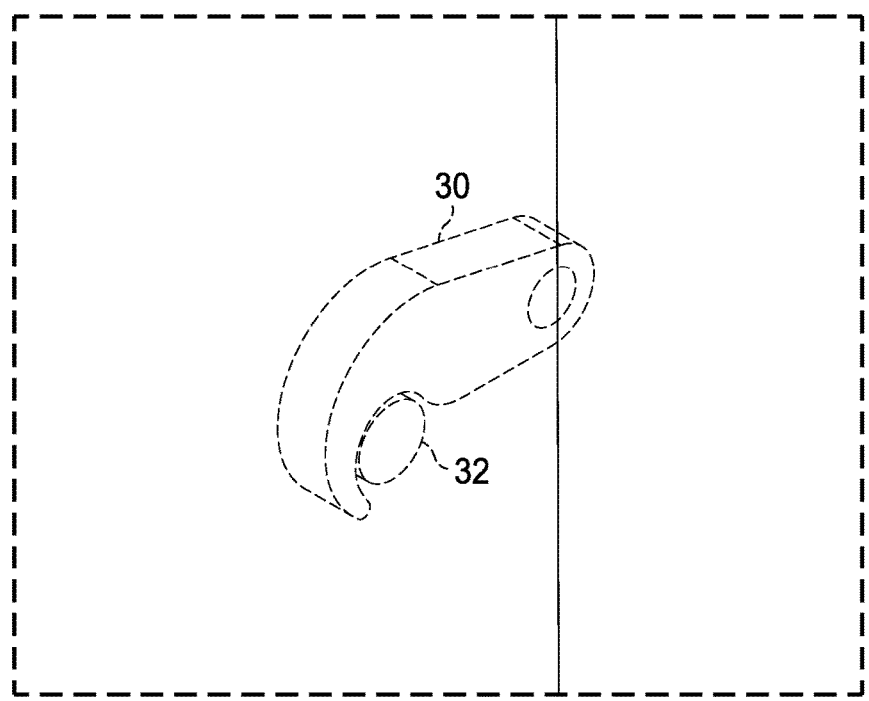
FIG. 1C shows a latch and latch bar mechanism used to joint together insulated structural panels.

The insulated structural panel is primarily assembled by virtue of the closed-cell polyurethane foam 28 acting as an adhesive to hold the sheathing and structural members in place. Insulated structural panels 20 or further typically design such that vertical structural members 22 include a tongue-in-groove, corrugated, saw-tooth, or other interlocking design on at least one face thereof. A latch 30 and latch-bar 32, or other suitable connecting hardware is typically disposed within the panel to facilitate joining the panels together. When the latch 30 is actuated to engage the latch-bar 32, for example, the insulated structural panels are drawn tightly together, as shown in FIGS. 1B and 1C.

The width of the structural panel may be determined by the application for which the insulated structural panels are to be used. The insulated polyurethane structural panels have a typical thermal resistance ("R-value") of up to R-8 per inch. Typical insulated structural panels that are 3 to 6 inches in width, accordingly have corresponding R-values of R-24 to R-48. The structural members 22 and 24, however, when constructed of wood, only have a total R-value of R-3 to R-8, depending on the thickness and density of the wood. Because of the poor insulative properties of structural panels manufactured with wood structural members 22, more warm air moves toward the lower-pressure refrigerated space predominantly at joint 30, and along frame members 22, 24. Over time, as the relatively warm and moist outside air travels to the frame & joint 30, condensation may form. In the case of an insulated structural panel system used for refrigeration, this condensation may remain in liquid form and become a source of potential mold or bacterial growth. In the case of insulated structural panel freezer systems, condensation formed a joint 30 can result in the formation of ice, which, when formed in, or within joint 30 can expand the joint. Expansion of this joint 30 further degrades the efficacy of the insulated structural panel system, especially at the joint 30. Additional problems with the prior art design as disclosed in FIGS. 1A and 1B are discussed in the Background of the Invention.

Figure 2:
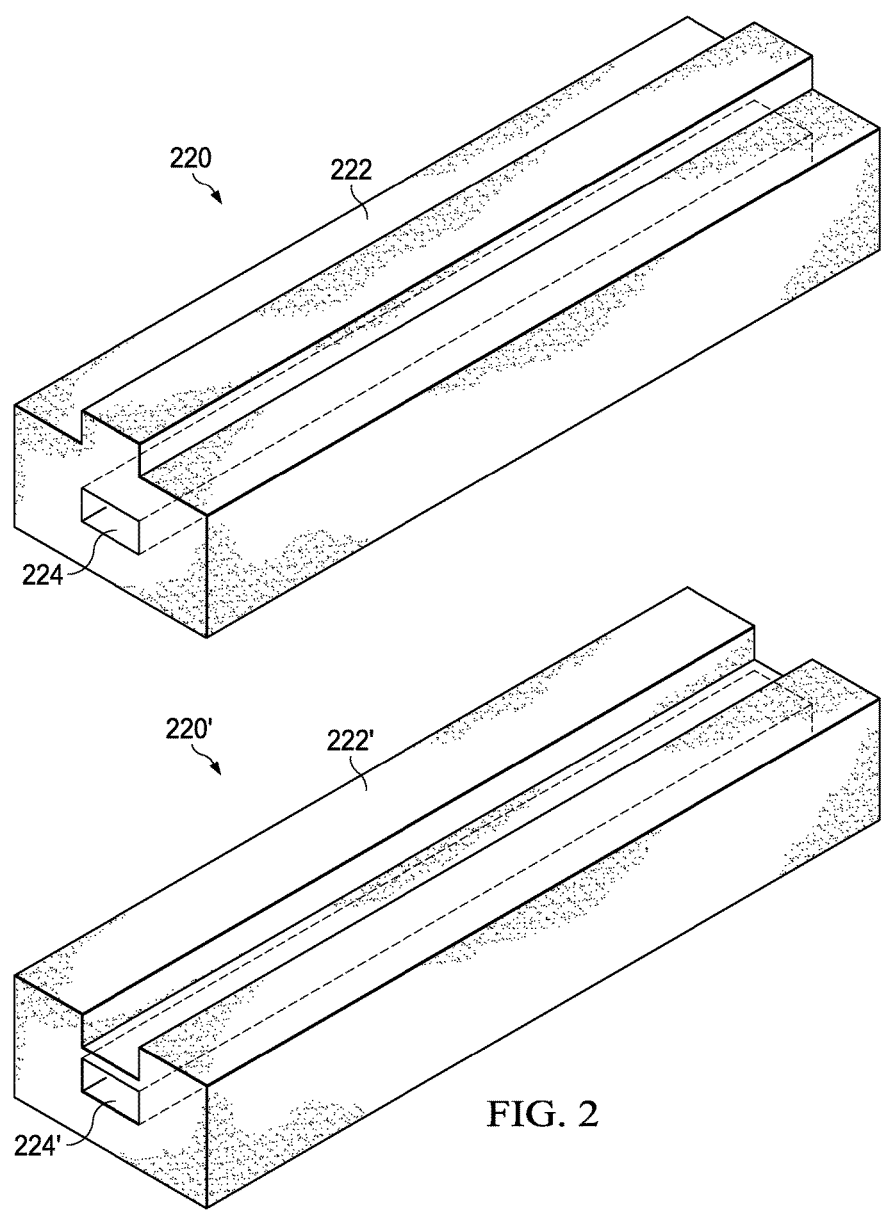
FIG. 2 shows an example of a structural member in accordance an embodiment of the present invention that is completely encased in HDR material.

The two shows an embodiment of a hybrid structural member for insulated panel that includes male structural member 220, high density insulating material (commonly known as High Density Rail, or "HDR" material) 222, and core member 224. Core member 224 is encapsulated within the HDR. The resulting hybrid structural member 220 results in 50% less polyurethane HDR material 222 being used for the structural member 220. Core member 224 may be dimensional lumber, plywood, magnesium oxide, gypsum, rigid plastic (such as polyvinyl, or other suitable rigid plastic), fiberglass, Kevlar, or other rigid composite. Core member 224 may also be made of suitable metal, as the surrounding HDR material 222 will sufficiently insulate core member 224 such that the R-value of structural member 220 is only affected negligibly, if at all. Other rigid or semi-rigid materials may be substituted for core member 224 without departing from the spirit and scope of the invention. Also shown in FIG. 2 is a female structural member 220', which includes HDR material 222' and core member 224'.

Several additional benefits from those disclosed in the background and summary of the invention include the ability to reduce the thickness of the structural member while simultaneously increasing the insulative properties of the overall panel. For example, a 5-inch-thick structural insulated freezer panel with a standard wood frame as an overall all panel R value of R 28. With a pure HDR structural member, the R-value of the structural panel increases to R-37. The hybrid structural member 220 and 220' have an R value of R-35. Similarly, a 4-inch structural insulated panel using a hybrid structural member in accordance with the embodiments shown at 220 and 222 have an overall R-value of R-28. Additionally, manufacturing structural insulated panels in accordance with the present invention eliminates the need for any structural backer applied between a HDR structural member and the insulation 24 shown in FIGS. 1A and 1B. Also, embodiments of the present invention allow for the use of a non-butyl gasket which may be integrally formed as part of the hybrid structural member, those obviating the need for the application of field-applied vapor sealant in freezer applications. In the embodiment shown in FIG. 2, the hybrid structural member 220 and 220' have a core member 224 that is completely surrounded on all sides by HDR material 222. Alternatively, the core member 224 could be surrounded only on the longitudinal sides of core member 224, such that the core member 224 is exposed at the top and bottom of the hybrid structural member, thus providing a more stable surface for attaching the panel to restructures, or before, respectively.

Figure 3A:
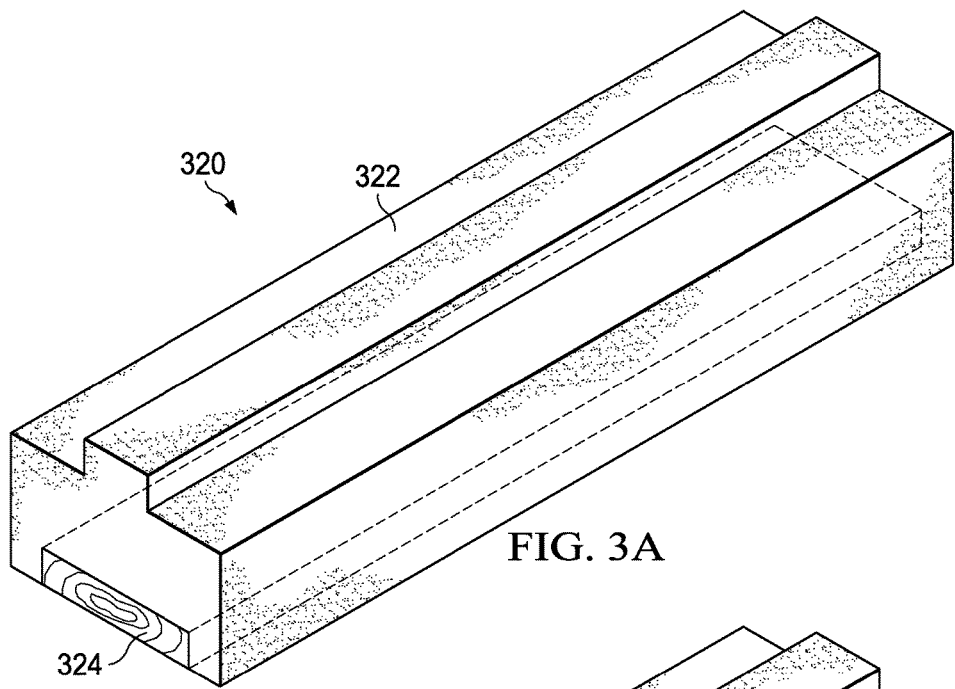
FIGS. 3A, 3B, and 3C show different examples of a structural member in accordance with embodiments of the present invention that are encased in HDR material on three sides.
Figure 3B:
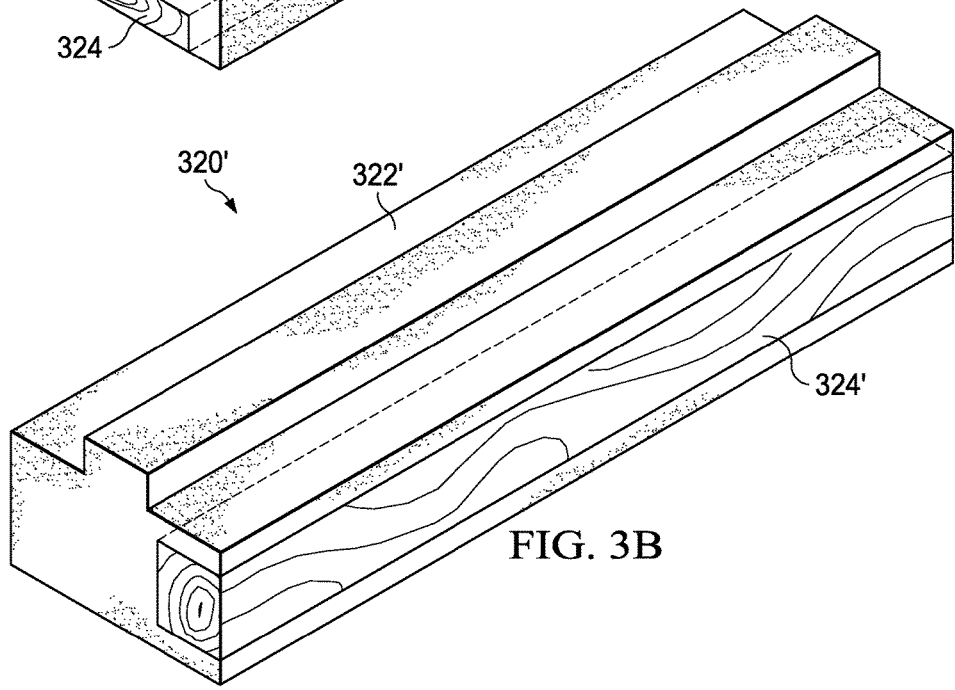
Figure 3C:
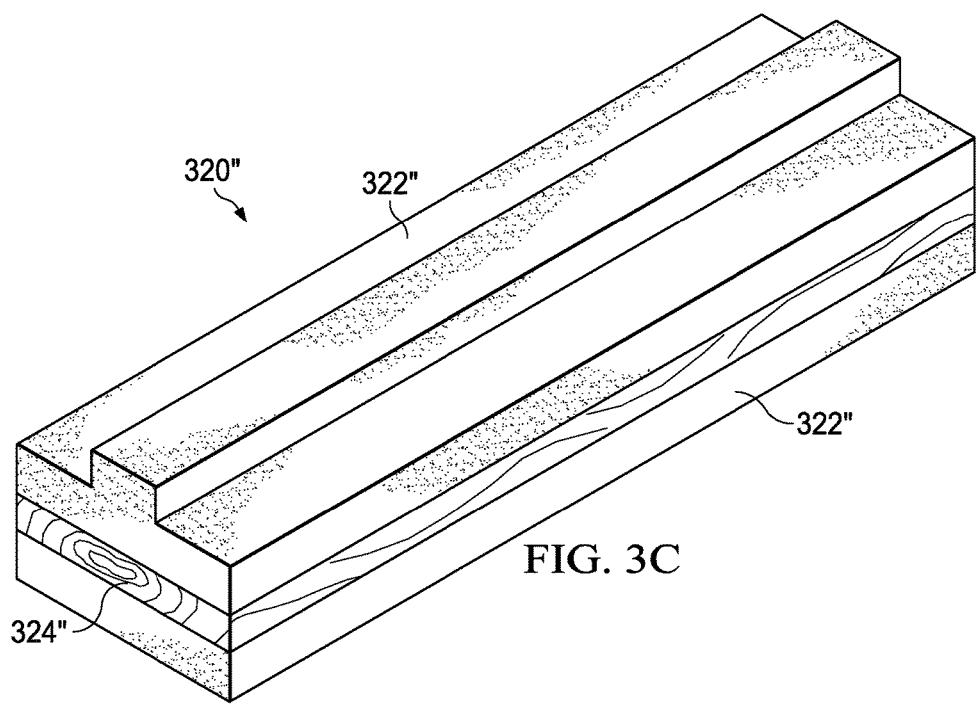

FIGS. 3A and 3B show an embodiment of a hybrid structural member 320 and 320' with a core member 324 and 324' that is surrounded on at least three sides by HDR material. In such a configuration, the advantages include ease of manufacture, while still isolating the core member 324 or 324' from exposure to internal or external environment. FIG. 3C shows an embodiment of a hybrid structural member 320" with a core member 324" that is enclosed on at least two sides with HDR material 322".

FIG. 4 shows an injection mold configured for manufacturing structural member. In one embodiment, injection mold 400 includes a cavity 410, shaped in accordance with the requirements of structural member shown in FIGS. 1A through 3C. In the particular embodiment shown in FIG. 4, the cavity is shaped for a male hybrid structural member. The cavity may include posts 420, pins 430, or screws 440. Alternatively, the injection mold 400 may include a vacuum system (not shown) to hold a core member 460 in place during an injection mold process.

Manufacture a hybrid structural panel in accordance with an embodiment of the present invention, one step is to insert the core member 460 into the cavity 410 of injection mold 400. Core member 460 may be held in place by the posts 420, the pins 430, the screws 440, or a vacuum system (not shown). With a core member 460 position within the cavity 410 of injection mold 400, HDR material 450 is injected into the cavity 410 to surround core member 460 on at least two sides, depending on the particular embodiment being manufactured. Once the cavity is completely filled by the HDR material 450, the hybrid structural member is allowed to cure, if necessary.

Figure 5:
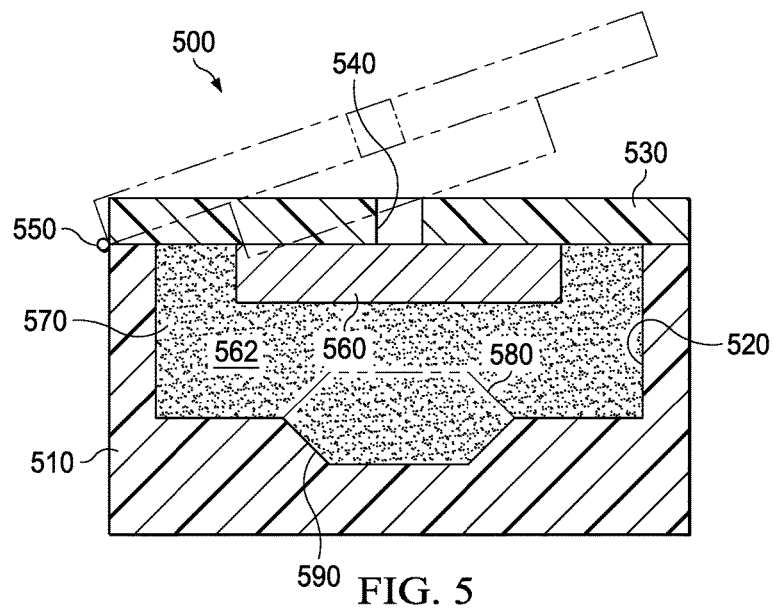
FIG. 5 shows a molding form for manufacturing a hybrid structural member in accordance with an embodiment of the present invention that includes a hybrid structural member, and a hinged lid.
Figure 6:
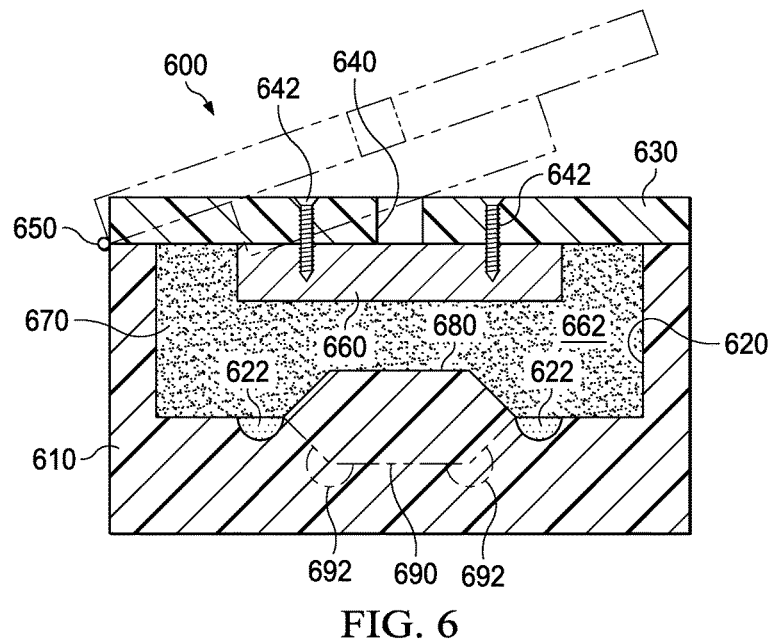
FIG. 6 shows a molding form for manufacturing hybrid structural member in accordance with an embodiment of the present invention that includes a hybrid structural member, a vacuum seal attachment, and vapor seal trenches.

FIGS. 5 & 6 show variations of a mold 500 and 600 in accordance with embodiments of the invention. FIG. 5 shows a mold body 510 having a mold cavity 520, a lid 530 having a vacuum aperture 540 disposed therethrough, which may be connected to the mold body 510 by a hinge 550 or other suitable device. In operation, a structural member 560, such as the aforementioned lumber, plywood, oriented strand board (OSB), magnesium oxide, or rigid polymer, or the like, may be attached to lid 530 via a vacuum operable to connect through the vacuum aperture 540. A volume of expanding HDR material 570 may be poured or injected into the mold cavity 520. The HDR material 570 expands such that it will fill the entire cavity 520, regardless of whether the mold cavity 520 is formed to have a female contour 580 or a male contour 590. The amount of HDR material 570 that is introduced into the cavity 520 determines the density of the HDR material for the finished (cured) hybrid member. Once the HDR material 570 is introduced into the mold cavity 520, the lid 530 with the structural member 560 is closed so that the HDR material 570 expands around the structural member 560 and fills all, or substantially all, of the cavity 520.

Additionally, sealant trenches 522 may be formed in mold cavity 520. The sealant trenches allow for a lower-density HDR material to be introduced the sealant trenches 522 and partially cured before introduction of the hybrid member HDR material 570 into the cavity 520. The resultant sealing ridges are compressible, and because they are foamed of the same HDR material as HDR material 570, but at a much lower density, the resultant hybrid member has a built-in sealant feature when the male and female members are joined, regardless of whether the sealant ridges are formed as part of a hybrid member formed using the female contour 580 or the male contour 590 of mold 500.

FIG. 6 shows a similar configuration as FIG. 5, albeit with like numbers from FIG. 5 (500-590) replaced with like numbers 600-690. FIG. 6 additionally shows sealing trenches 692 in a possible placement adjacent to male contour 690. FIG. 6 also shows structural member attaching devices 642 disposed through lid 630. The attaching devices 642 may be screws, nails, pins, or other suitable attachment devices to hold structural member 660 in place with respect to lid 630.

It should be understood that in addition to the male and female contours 580/680 and 590/690, respectively, the mold cavity could have no contour, and therefore be flat. Additionally, the contour could be corrugated, saw-tooth, or other configuration that would allow adjacent members to interlock when abutted against one another.

Figure 7:
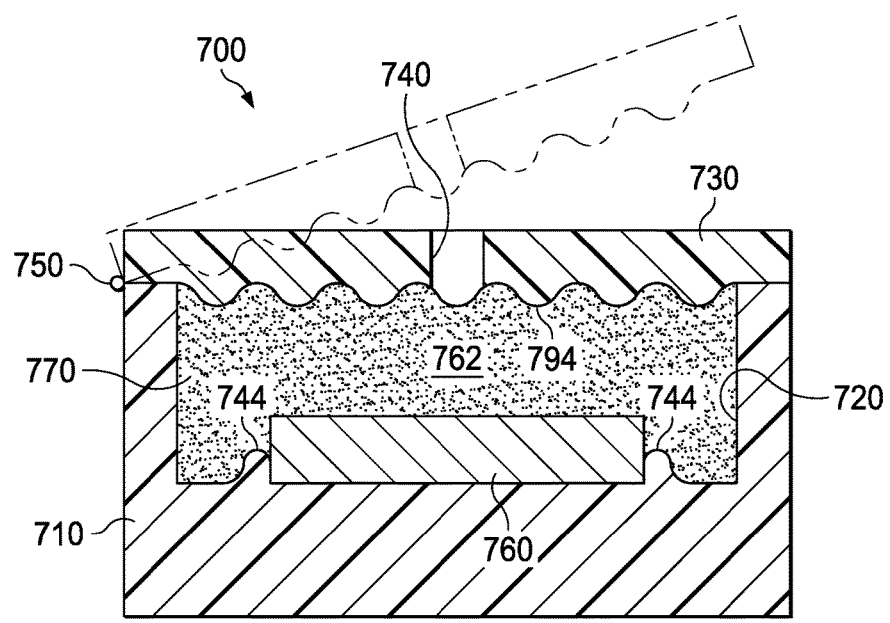
FIG. 7 shows a molding form for manufacturing a hybrid structural member in accordance with an embodiment of the present invention that includes a track or rail system for holding a structural member in place in the mold.

FIG. 7 shows an alternative mold design 700 in which the structural member 760 is held in place via ridges 744. In a mold 700 in accordance with FIG. 7, a structural member 760 is simply placed between the ridges 744 disposed at the bottom of cavity 720 of the mold body 710. The HDR material 770 may be then poured or injected into mold cavity 720 on top of the structural member 760. The lid 730 is shaped with a contour, if desired, to shape the face of the hybrid structural member 762, such as male, female, corrugated (shown), saw-tooth, or other configuration as described above.

While the present invention has been described in detail, it is not intended to be limited. Accordingly, various changes, variations, and substitutions may be made without departing with the scope of the invention as disclosed.

What is claimed is:

1. An insulated veneer panel system, comprising:
   an insulated panel formed of closed cell polyurethane foam disposed between sheathing material on first and second faces of the insulated panel, the insulated panel defined by first and second sides;
   an elongated hybrid structural member, formed of an elongated core member and a high density insulating material, disposed against at least one of the first and second sides of the insulated panel;
   the core member having a cross section defined by at least a length and a width, wherein the length and the width define a surface area at each end of the core member;
   wherein the high density insulating material of the elongated structural member substantially covers at least two surfaces defined by the length, width, and surface area at each end of the core member, thereby forming a hybrid structural member.

2. The hybrid structural member of claim 1, wherein the core member is comprised of dimensional lumber.

3. The hybrid structural member of claim 1, wherein the core member is comprised of a metal.

4. The hybrid structural member of claim 1, wherein the core member is comprised of gypsum.

5. The hybrid structural member of claim 1, wherein the core member is comprised of plywood.

6. The hybrid structural member of claim 1, wherein the core member is comprised of a rigid plastic.

7. The hybrid structural member of claim 1, wherein the core member is comprised of a ceramic.

8. The hybrid structural member of claim 1, wherein the core member is magnesium oxide.

9. The hybrid structural member of claim 1, wherein the high density insulating material comprises polyurethane.

10. The hybrid structural member of claim 1, further comprising a non-butyl gasket integrally formed at an exterior surface of the hybrid structural member.

11. The hybrid structural member of claim 1, wherein the high density insulating material comprises one of polyurethane or polyisocyanurate.

12. The hybrid structural member of claim 11, wherein the density of the high density insulating material is at least 2.2 lb/ft$^3$.

13. A method for manufacturing a hybrid structural member for use in an insulated veneer panel system, comprising:
   positioning an elongated core member within a cavity of a mold, wherein the mold is configured to be closed on all sides around the core member, and wherein the mold cavity defines a predetermined cross section of the hybrid structural member, the cross section having a defined length and width;

surrounding at least two sides of the core member with an expanding high density insulating material, wherein the high density insulating material expands to fill the mold cavity in the predetermined shape defined by the mold cavity, thereby forming the hybrid structural member; wherein the mold cavity defines at least one of a male and a female cross section of the hybrid structural member to enable an interlocked fit between first and second ones of the insulated veneer panels having a hybrid structural member disposed along at least one side thereof.

14. The method of claim 13, wherein comprising the step of:

positioning the core member within the mold cavity by attaching the core member to an interior surface of the mold cavity.

15. The method of claim 14, wherein attaching the core member to a lid of the mold cavity.

16. The method of claim 14, wherein comprising the step of:

holding the core member in place by a vacuum.

17. The method of claim 14, wherein comprising the step of:

holding the core member in place by screws.

18. The method of claim 14, wherein comprising the step of:

holding the core member in place by pins.

19. The method of claim 14, wherein comprising the step of:

holding the core member in place by rails disposed on the interior surface of the mold cavity.

20. The method of claim 19, wherein the rails are disposed on the interior surface of the mold cavity opposite the lid.

21. The method of claim 13, wherein the high density insulating material comprises a density of at least 1.8 lb/ft$^3$.

22. The method of claim 13, wherein the mold cavity further comprises sealing trenches, and wherein the expanding high-density insulating material comprises a first expanding high-density insulating material and a second expanding high-density insulating material, and wherein the first expanding high-density insulating material is first disposed in the sealing trenches, and wherein thereafter the second expanding high-density insulating material is disposed in the remainder of the mold cavity, and wherein the first expanding high-density insulating material has a lower density than the second expanding high-density insulating material.

* * * * *